United States Patent
Saunders et al.

(10) Patent No.: US 6,305,546 B1
(45) Date of Patent: Oct. 23, 2001

(54) FOOD STORAGE CONTAINERS

(75) Inventors: Craig Saunders, Rocky River, OH (US); Edward S. Robbins, III, 2802 E. Avalon Ave., Muscle Shoals, AL (US) 35662; Ronald White, Florence, AL (US)

(73) Assignee: Edward S. Robbins, III, Muscle Shoals, AL (US)

(*) Notice: Subject to any disclaimer, the term of this patent is extended or adjusted under 35 U.S.C. 154(b) by 0 days.

(21) Appl. No.: 09/503,732

(22) Filed: Feb. 15, 2000

Related U.S. Application Data
(60) Provisional application No. 60/134,211, filed on May 14, 1999.

(51) Int. Cl.[7] .................................................. A45C 11/20
(52) U.S. Cl. .................. 206/541; 206/459.1; 220/367.1
(58) Field of Search .................................. 206/541, 551, 206/459.5, 550, 557, 459.1; 220/212, 326, 367.1, 913; 229/406, 407, 904, 906; 426/113, 118, 395; 116/308, 309, 227, 317

(56) References Cited

U.S. PATENT DOCUMENTS

| | | |
|---|---|---|
| D. 339,744 | 9/1993 | Seppala . |
| D. 365,251 | 12/1995 | Lo . |
| D. 394,807 | 6/1998 | Krupa et al. . |
| D. 409,910 | 5/1999 | Hayes et al. . |
| 2,779,497 * | 1/1957 | Kollman et al. .................. 220/367.1 |
| 3,392,468 * | 7/1968 | Wolf .................................. 206/459.5 |
| 3,818,858 | 6/1974 | Kramer et al. . |
| 3,902,540 | 9/1975 | Commisso . |
| 4,029,033 | 6/1977 | Kerwin et al. . |
| 4,183,446 | 1/1980 | Davis . |
| 4,576,306 | 3/1986 | Kelsey et al. . |
| 4,576,330 | 3/1986 | Schepp . |
| 4,621,670 | 11/1986 | Yuen . |
| 4,653,685 | 3/1987 | Leary et al. . |
| 4,660,716 * | 4/1987 | McMahon et al. .................. 206/541 |
| 4,662,520 | 5/1987 | Griffin . |
| 4,986,438 | 1/1991 | Borst . |
| 5,036,980 | 8/1991 | Vigue et al. . |
| 5,046,659 | 9/1991 | Warburton . |
| 5,094,355 | 3/1992 | Clark et al. . |
| 5,096,084 * | 3/1992 | Wells .................................. 220/326 |
| 5,322,182 | 6/1994 | Fritz . |
| 5,363,978 * | 11/1994 | Molo ................................ 220/367.1 |
| 5,381,901 | 1/1995 | Hundley . |
| 5,407,087 | 4/1995 | Giblin et al. . |
| 5,423,453 | 6/1995 | Fritz . |
| 5,460,282 | 10/1995 | Giblin et al. . |
| 5,462,185 | 10/1995 | Walker, III . |
| 5,584,408 | 12/1996 | Orkisz . |
| 5,587,192 | 12/1996 | Beizermann . |
| 5,605,231 * | 2/1997 | Borsboom et al. .................. 206/551 |
| 5,607,709 | 3/1997 | Fritz et al. . |
| 5,695,798 | 12/1997 | Rozzano . |
| 5,758,791 | 6/1998 | Mangla . |
| 5,860,530 | 1/1999 | Simmons et al. . |
| 5,901,848 | 5/1999 | Gorlich et al. . |
| 5,947,321 * | 9/1999 | Vadney .............................. 220/367.1 |
| 6,000,159 * | 12/1999 | Hornung ............................ 220/212 |
| 6,095,324 * | 8/2000 | Mullin ................................ 206/551 |

* cited by examiner

Primary Examiner—Luan K. Bui
(74) Attorney, Agent, or Firm—Nixon & Vanderhye P.C.

(57) ABSTRACT

A plastic food storage container includes a container body having a bottom and a peripheral wall, an upper end of the container body having a peripheral rim; a lid having a peripheral edge adapted to matingly engage the peripheral rim; a region of the lid having a lifting tab extending outwardly from the peripheral edge, and a vent located in the region.

8 Claims, 4 Drawing Sheets

FOOD STORAGE CONTAINERS

This application claims the benefit of U.S. Provisional Application No. 60/134,211, filed May 14, 1999, the entire content of which is hereby incorporated by reference in this application.

BACKGROUND AND SUMMARY OF THE INVENTION

This invention relates to plastic food storage containers which incorporate various new features, relating to, for example, attachment and detachment of the container lids, steam venting and multiple compartments.

With regard to the attachment and detachment features, the container lids may have outer peripheral depending walls which are provided with substantially V-shaped notches which provide a hinging mechanism facilitating the removal of the lids from the containers. In addition, the lids may be provided with one or more outwardly extending tabs which mate with similarly designed tabs extending outwardly from the container rims which facilitate removal of the lids but which also provide convenient holding locations for the container/lid assemblies. This arrangement permits secure attachment of the lids to the containers, and may even allow the lid to be opened without being removed from the container. These tabs may also have peripheral depending skirt portions incorporating notched hinges of the type described above to facilitate lifting of the tabs.

The venting arrangements incorporated into the lids may comprise relatively small domed regions (i.e., bumps) or elongated vent "tunnels" near the outer peripheral edge of the lid, and spaced relatively closely to the tabs facilitating detachment of the lids. Thus, as the lid is initially pulled away from the container, steam is allowed to vent almost simultaneously.

In another steam venting arrangement, a hinged tab or strap is formed with a detent on a free end thereof which is inserted within a mating aperture in the lid. This tab or strap may be attached directly to the container rim so that when it is in mating engagement with the aperture in the lid, it effectively serves to lock the lid to the container.

Additional features are apparent from the attached drawings and from the detailed description below.

BEST MODE FOR CARRYING OUT THE INVENTION

Figure 1:
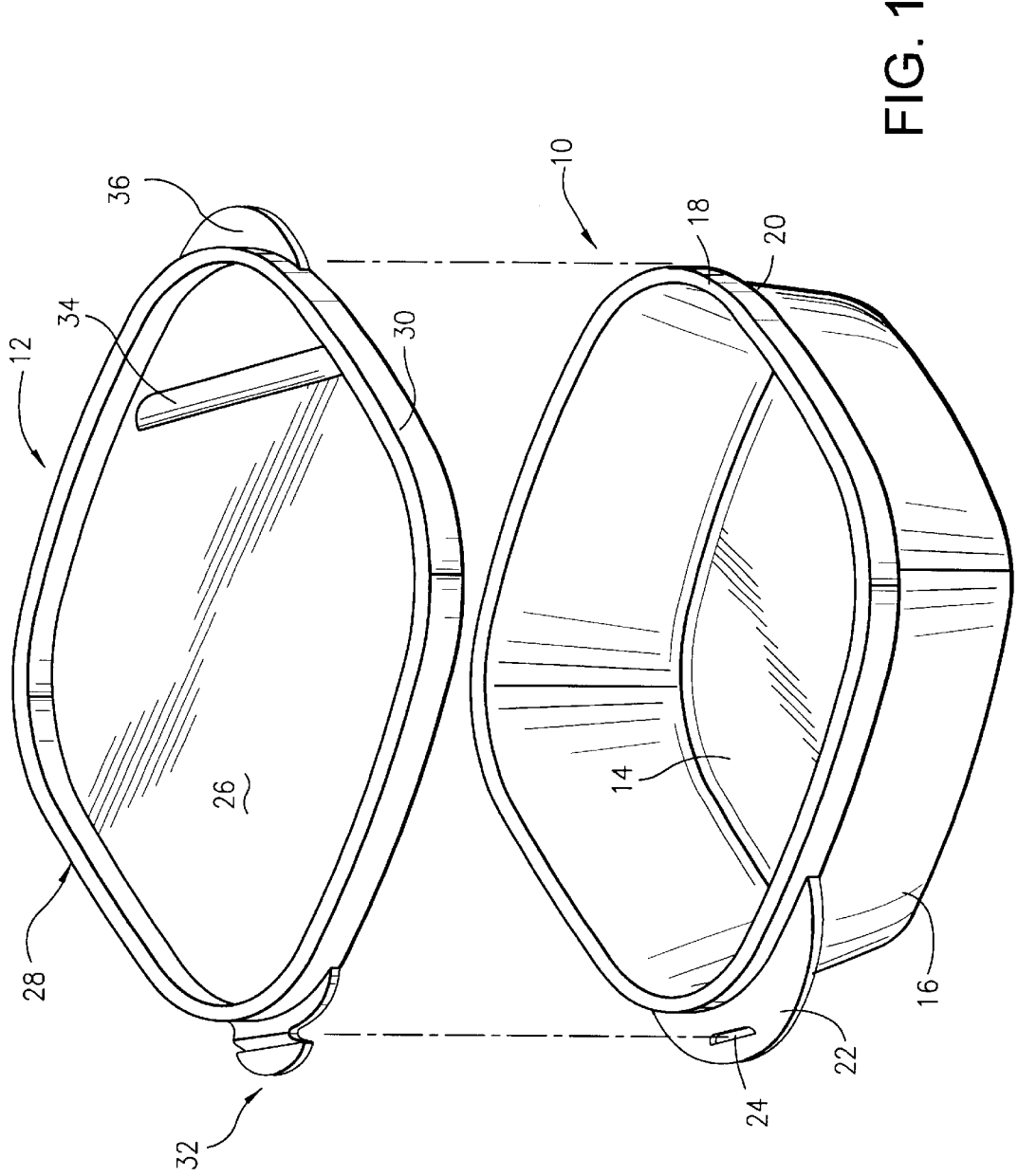
FIG. 1 is an exploded perspective view of the container and lid assembly in accordance with a first exemplary embodiment of the invention.

With reference to FIG. 1, a food storage container in accordance with the invention includes a container 10 and an associated lid 12. Both the container and lid may be made of any suitable plastic material, and may be substantially transparent or opaque.

The container 10 includes a bottom 14 and a peripheral wall 16 with a rim 18 extending about the periphery of the container. The rim 18 may have a depending skirt portion 20 which adds rigidity to the flexible container. A projecting tab 22 extends outwardly from the skirt portion 20 in a corner area of the container and is formed with an elongated recess or groove 24.

The lid 12 is formed with a top surface 26 and a surrounding peripheral rim 28 which is designed to mate with the rim 18 of the container body 10. Thus, the peripheral rim 28 also includes a depending skirt portion 30. In addition, a push-in tab 32 extends outwardly from the skirt portion 30 and is adapted to seat within the slot 24 on the tab 22 of the container in order to hold the lid to the container. This arrangement also serves as a hinge so that the lid can be opened and closed without it being separated from the container. Of course, the frictional holding force can be overcome if separation is desired. A raised tunnel vent 34 extends diagonally across one corner of the container lid, the tunnel vent raised upwardly out of the plane of the top 26. In that same corner, a tab 36 extends outwardly from the lid rim 30 and facilitates removal of the lid. It will be appreciated that as the tab and lid are lifted, the tunnel vent 34 will permit almost simultaneous venting of any steam generated by heated food contents within the container.

The illustrated container is formed with a 20 oz. "well" but it will be appreciated that the size of the container may vary as desired.

Figure 2:
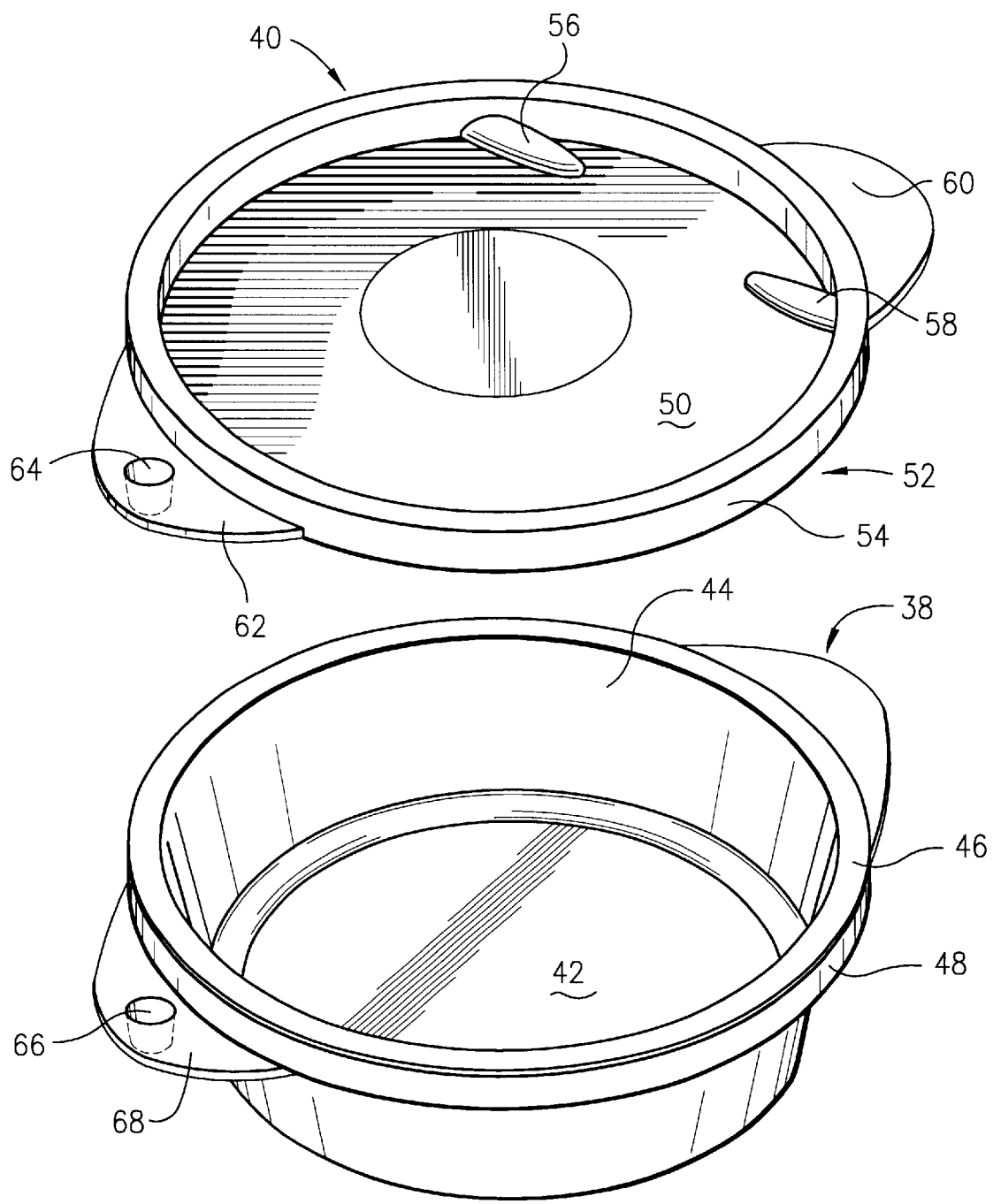
FIG. 2 is an exploded perspective view of the container and lid assembly in accordance with a first exemplary embodiment of the invention.

FIG. 2 illustrates a round container 38 and associated round lid 40. As in the previously described embodiment, the container 38 has a bottom 42, a peripheral wall 44, and a peripheral rim 46 which includes a depending skirt portion 48. The associated lid 40 has a top surface 50 and a peripheral rim 52 which also includes a depending skirt portion 54, it being understood that the rims 46 and 52 are designed for close, mating engagement. A pair of steam tunnels 56, 58 are formed in the top surface 50 of the lid, in relatively close proximity to a lifting tab 60 extending outwardly from the lower edge of the lid skirt 54. A second tab 62 extends away from the skirt 54 at a diametrically opposite location. An integral post 64 formed from on the tab 62, and extending downwardly from the tab, is designed to mate with a detent 66 formed in a tab 68 extending outwardly from the peripheral skirt portion 48 of the container rim 46. The frictional engagement of the post 64 within the recess 66 provides for secure engagement of the lid to the container and also provides a convenient holding location, along with the tab 60. Note also that because the tab 68 on the container underlies the tab 62 on the lid, when the user can hold the container/lid assembly without fear of the lid separating from the container. The extent of the projection of the container tab may be less than that of the lid tab to provide a force application area directly on the lid tab to facilitate the removal of the lid. The length of the tabs and the frictional engagement between post 64 and recess 66 also allow some hinging action between the lid and container.

It is also a feature of the invention that the plastic lid top surface 50 be receptive to ink or other marking media, but which also permits the media to be wiped off the surface.

Figure 3:
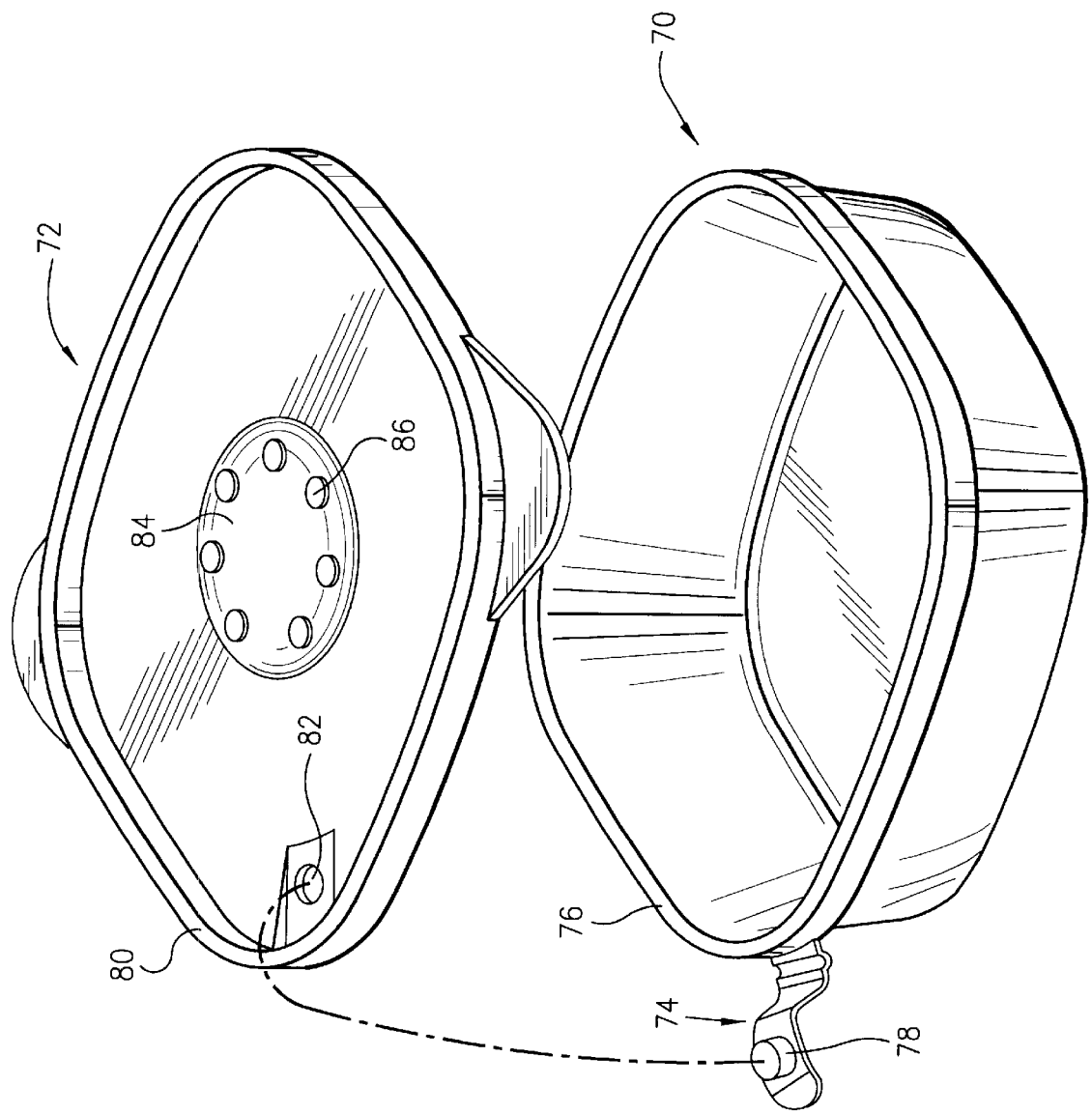
FIG. 3 is an exploded perspective view of the container and lid assembly in accordance with a first exemplary embodiment of the invention.

FIG. 3 illustrates another embodiment of the invention including a container 70 and an associated lid 72 of somewhat modified oval shape. The container and lid assembly shown in FIG. 3 contains similar features as those described previously in connection with FIGS. 1 and 2 with the following exceptions. In FIG. 3, a fold-over vent and lid retention strap 74 is integrally formed with the container rim 76 with a post element 78 formed adjacent the free end of the strap 74. This strap is adapted to extend over the peripheral rim 80 of the lid 72 with the post 78 adapted to fit within the vent hole 82 formed in the top of the lid. This strap, when in place with the post 78 engaged within the hole 82, serves both as a steam vent and also as a lid retention mechanism, effectively locking the lid to the container.

The lid 72 is also provided with a domed area 84 formed with a plurality of pop-in/pop-out date dots 86.

Figure 4:
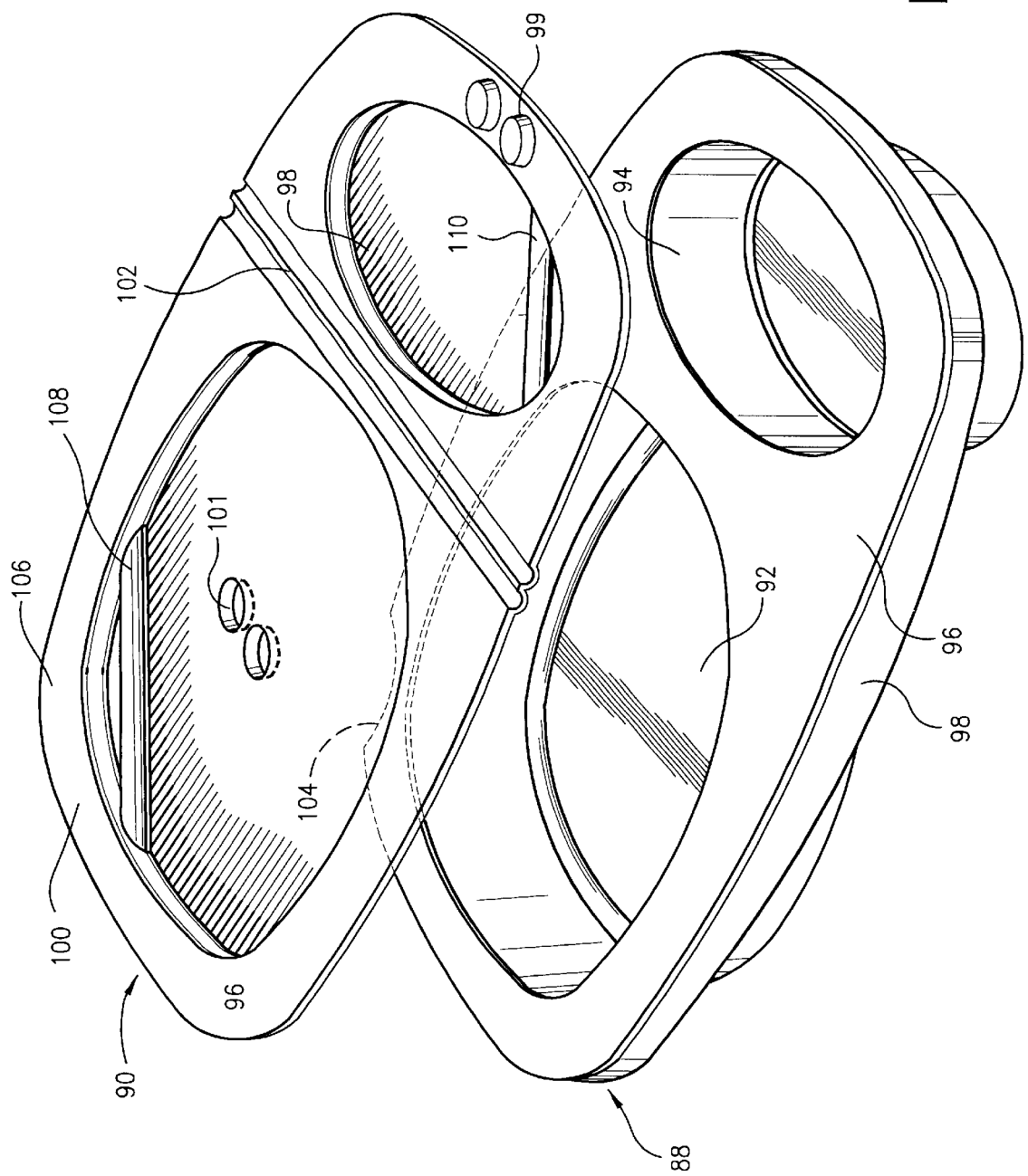
FIG. 4 is an exploded perspective view of the container and lid assembly in accordance with a first exemplary embodiment of the invention.

FIG. 4 illustrates yet another embodiment of the invention, including a double compartmented container 88 and associated lid 90. The container 88 includes a pair of separated compartments 92, 94 which extend below a generally flat surface 96 which also forms part of the peripheral rim of the container. The latter also includes a depending skirt portion 98. In this embodiment, the lid 90 includes depressed or recessed regions 96, 98 which are adapted to frictionally engage within the container compartment portions 92, 94. These recessed regions 96, 98 are surrounded by a flat surface 100 adapted to seat on the top surface 96 of the container. It should be appreciated, however, that the lid 90 could also be formed in a manner similar to those described in connection with FIGS. 1–3, with a depending skirt portion adapted to telescope over the depending skirt portion 98.

The lid 90 is also formed with a molded in accordion hinge 102 extending across the lid, between the recess regions 96, 98, thereby providing a transverse hinge permitting the container lid to be removed from the container. The hinge 102 allows the container to be folded over onto itself, with ridges 99 engaged within mating recesses 101.

Note also the cut-out region 104 in one corner of the container 88 which provides access for the corner region 106 of the lid, thereby facilitating removal of the lid from the container. A steam tunnel vent 108 extends diagonally across the corner portion, adjacent the lifting portion 106. A similar but smaller tunnel vent 110 extends across a corner portion of the recessed portion 98, thus providing separate and discrete tunnel vents for both compartments 92 and 94 of the container.

In the event the lid has a depending skirt portion as in the previously described embodiments, V-shaped notches would be provided in the peripheral skirt portion at locations corresponding to the edges of the molded in accordion hinge to facilitate removal of the lid.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A plastic food storage container comprising a container body having a bottom and a peripheral wall, an upper end of the container body having a peripheral rim; a lid having a peripheral edge adapted to matingly engage said peripheral rim; a region of the lid having a lifting portion adjacent said peripheral edge, and at least one vent located in said region of said lid, said at least one vent having a tubular configuration projecting above and extending along a plane of a top surface of said lid.

2. The plastic food storage container of claim 1 wherein, in an opposite region, said peripheral rim of said container body and said peripheral edge of said lid are provided with retention means for securing said lid to said container body in open and closed positions.

3. The plastic food storage container of claim 1 wherein said peripheral rim includes a depending skirt.

4. The plastic food storage container of claim 2 wherein said container body and lid have a generally polygonal shape and wherein said region and said opposite region comprise a corner and an opposite corner.

5. The plastic food storage container of claim 2 wherein said container body and lid are round and wherein said region and said opposite region are in diametrically opposite locations.

6. The plastic food storage container of claim 1 wherein said lid is receptive to marking media.

7. The plastic food storage container of claim 1 wherein said at least one vent comprises a pair of vents, each having a tubular configuration projecting above said top surface of said lid.

8. A plastic food storage container comprising a container body having a bottom and a peripheral wall, an upper end of the container body having a peripheral rim; a lid having a peripheral edge adapted to matingly engage said peripheral rim; a region of the lid having a lifting portion adjacent said peripheral edge, and at least one vent located in said region of said lid, wherein said lid is provided with a domed region provided with a plurality of pop-in, pop-up date dots.

* * * * *